(12) United States Patent
Lee et al.

(10) Patent No.: US 7,260,366 B2
(45) Date of Patent: Aug. 21, 2007

(54) APPARATUS AND METHOD FOR TRANSMITTING AND RECEIVING DATA USING AN ANTENNA ARRAY IN A MOBILE COMMUNICATION SYSTEM

(75) Inventors: Yong-Suk Lee, Yongin-shi (KR); Sung-Jin Kim, Suwon-shi (KR); Jong-Hyeuk Lee, Inchon-Kwangyokshi (KR); Sang-Hwan Park, Suwon-shi (KR); Hun-Kee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 514 days.

(21) Appl. No.: 10/222,221

(22) Filed: Aug. 16, 2002

(65) Prior Publication Data

US 2003/0060173 A1     Mar. 27, 2003

(30) Foreign Application Priority Data

Aug. 18, 2001   (KR) ............................... 2001-49831

(51) Int. Cl.
*H04B 1/02*   (2006.01)
*H04B 7/00*   (2006.01)
*H04J 3/16*   (2006.01)

(52) U.S. Cl. .................... 455/102; 455/103; 455/506; 455/512; 455/69; 455/561; 370/465; 370/480

(58) Field of Classification Search ................ 455/103, 455/102, 115.1, 115.3, 450, 452.2, 504–506, 455/509, 512, 513, 59, 61, 67.11, 69, 272, 455/273, 63.1, 72; 370/464, 465, 479, 480, 370/473, 252; 714/746–758, 774, 790, 800
See application file for complete search history.

(56) References Cited

U.S. PATENT DOCUMENTS 5,140,417 A * 8/1992 Tanaka et al. ......... 375/240.01
5,570,411 A * 10/1996 Sicher .................... 455/450
5,825,430 A * 10/1998 Adolph et al. ........... 348/487
5,845,212 A * 12/1998 Tanaka .................... 455/437
6,108,374 A *  8/2000 Balachandran et al. ..... 375/227
6,317,462 B1 * 11/2001 Boyce .................. 375/240.27
6,496,520 B1 * 12/2002 Acosta .................... 370/474

(Continued)

FOREIGN PATENT DOCUMENTS

GB       2 270 235       3/1994

(Continued)

OTHER PUBLICATIONS

Sophia Antipolis, "Enhanced Symbol Mapping method for the modulation of Turbo-coded bits based on bit priority", 3GPP TSG RAN WG1/WG2 Joint Meeting on HSDPA, Apr. 5-6, 2001.*

(Continued)

*Primary Examiner*—Duc M. Nguyen
(74) *Attorney, Agent, or Firm*—The Farrell Law Firm

(57) ABSTRACT

A data transmitting/receiving apparatus and method using an antenna array in a mobile communication system. A Node B measures a transmission status of each transmission antenna, classifies transmission data according to priority, and transmits to a UE high-priority data through a transmission antenna at a relatively good transmission status and low-priority data through a transmission antenna at a relatively poor transmission status.

26 Claims, 14 Drawing Sheets

U.S. PATENT DOCUMENTS

| | | | |
|---|---|---|---|
| 6,611,695 B1* | 8/2003 | Periyalwar | 455/450 |
| 6,662,024 B2* | 12/2003 | Walton et al. | 455/562.1 |
| 6,744,738 B1* | 6/2004 | Park et al. | 370/252 |
| 6,826,233 B1* | 11/2004 | Oosawa | 375/240.27 |
| 6,925,131 B2* | 8/2005 | Balakrishnan et al. | 375/299 |
| 2001/0053143 A1* | 12/2001 | Li et al. | 370/344 |
| 2002/0062472 A1* | 5/2002 | Medlock et al. | 716/1 |
| 2002/0146074 A1* | 10/2002 | Ariel et al. | 375/240.27 |
| 2002/0157058 A1* | 10/2002 | Ariel et al. | 714/774 |
| 2002/0163879 A1* | 11/2002 | Li et al. | 370/200 |
| 2002/0181581 A1* | 12/2002 | Birru et al. | 375/240.01 |
| 2002/0183020 A1* | 12/2002 | Zhu et al. | 455/108 |
| 2002/0199147 A1* | 12/2002 | Kim et al. | 714/748 |

FOREIGN PATENT DOCUMENTS

| | | |
|---|---|---|
| JP | 7-250374 | 9/1995 |
| JP | 09-037339 | 2/1997 |
| JP | 11-018139 | 1/1999 |
| JP | 2001-505723 | 4/2001 |
| JP | 2004-515152 | 5/2004 |
| WO | WO 93/17531 | 9/1993 |
| WO | WO93/17531 | 9/1993 |
| WO | WO 00/60884 | 10/2000 |

OTHER PUBLICATIONS

Combined Search and Examination Report dated Feb. 17, 2003, issued in a counterpart application, namely, Appln. No. GB0219136.9.

Russian Office Action dated Oct. 3, 2003 issued in a counterpart application, namely, Appln. No. 2002122365/09.

* cited by examiner

APPARATUS AND METHOD FOR TRANSMITTING AND RECEIVING DATA USING AN ANTENNA ARRAY IN A MOBILE COMMUNICATION SYSTEM

PRIORITY

This application claims priority to an application entitled "Apparatus and Method for Transmitting and Receiving Data Using Antenna Array in a Mobile Communication System" filed in the Korean Industrial Property Office on Aug. 18, 2001 and assigned Serial No. 2001-49831, the contents of which are hereby incorporated by reference.

BACKGROUND OF THE INVENTION

1. Field of the Invention

The present invention relates generally to a data transmitting/receiving apparatus and method in a mobile communication system including an antenna array, and in particular, to a data transmitting/receiving apparatus and method in a mobile communication system having an antenna array for antenna diversity.

2. Description of the Related Art

In general, a radio channel environment has low reliability relative wired channels due to multipath fading, shadowing, propagation attenuation, time-varying noise, and interference. This is an obstacle to increasing data rate and thus many techniques have been proposed to overcome the limitations of the radio channels. Major examples are error control coding for suppressing the effects of signal distortion and noise and antenna diversity for overcoming fading.

Codes used for the error control coding are mainly memoryless codes and memory codes. The memoryless codes include a linear block code and the memory codes include a convolutional code and a turbo code. Depending on the type of error control coding employed, encoder outputs are divided into systematic bits (information bits) and parity bits. A major code used for separate output of systematic bits and parity bits is a turbo code although systematic bits and parity bits are also separately output with a systematic convolutional code. Here, the systematic bits are pure user information to be transmitted and the parity bits are bits added to compensate for errors generated during transmission at decoding. However, even an error control coded signal is not immune to burst errors in systematic bits or parity bits. The burst errors often occur on a fading channel. Interleaving, a technique for preventing burst errors, is a process of distributing defective data.

Generally, transmission bits are grouped into a transport block of a predetermined size as an encoder input unit in a higher layer. An encoder encodes a transport block and outputs systematic bits and parity bits. An interleaver interleaves the sequence of the coded bits in a predetermined rule. The interleaver output is processed appropriately according to a transmission scheme such as CDMA (Code Division Multiple Access), FDM (Frequency Division Multiplexing), or OFDM (Orthogonal Frequency Division Multiplexing). Then the resulting radio signal is transmitted through an antenna.

Antenna diversity is a technique of receiving a plurality of signals that have experienced fading individually to cope with the fading. Diversity technology includes time diversity, frequency diversity, multipath diversity, and space diversity. The time diversity is realized by combining channel encoding with interleaving. In the frequency diversity, signals transmitted with different frequencies undergo different multipath fading. The multipath diversity is achieved by discriminating multipath signals using different fading information. The space diversity is implemented using antenna arrays in a transmitter and a receiver alone or together to achieve diversity using mutually independent fading signals.

The error control coding and diversity techniques for radio channels, however, have limitations in satisfying the demands for high rate data service like Internet access and multimedia service unless frequency efficiency is increased. Therefore, mobile communication systems having antenna arrays have been studied to achieve high frequency efficiency.

An antenna array system having a plurality of antennas is included in a transmitter/receiver to increase frequency efficiency using space. Considering the limits of time and frequency domains, a higher data rate can be achieved easily using space. BLAST (Bell Lab Layered Space Time) or space division multiplexing is adopted as such an antenna array system. Since each antenna transmits independent information, antenna array systems are substantially MIMO (Multi Input Multi Output) systems.

Small correlation coefficients between channels established between transmission antennas and reception antennas lead to the increase of frequency efficiency and thus system capacity in an antenna array system. Only if the correlation coefficients are small, information transmitted from each of the transmission antennas takes different channels, so that a UE (User Equipment) can discriminate the information from each transmission antenna. In other words, a signal from each transmission antenna can be identified and channel capacity is increased, as long as it has a different space characteristic. The antenna array system is suitable for an environment where multipath signals have different space characteristics. Under a LOS (Line of Sight) environment, the antenna array system, which is also a multi-transmission/reception antenna system, is not so effective as a single transmission/reception antenna system. Therefore, the antenna array system is effective in an environment where multiple signal paths are generated due to the presence of many scatters between the transmitter and the receiver, i.e., an environment where correlation coefficients between the transmission and reception antenna channels are small and thus diversity effects can be achieved.

The use of an antenna array in the transmitter/receiver increases channel capacity. The channel capacity is determined according to whether the receiver/transmitter acquires information about channels transmitted from the transmitter to the receiver. The channel capacity is maximized when both the transmitter and receiver know the channel information and is minimized when neither of them knows the channel information. When only the receiver acquires the channel information, the channel capacity is in the middle, between the channel capacities of the above two cases. To acquire the channel information, the transmitter estimates channel condition or receives feedback information about the channel condition from the receiver. The channel information required in the antenna array system is channel responses between the transmission antennas and the reception antennas, and increases in proportion to the number of the transmission/reception antennas. Therefore, the antenna array system advantageously increases the channel capacity in proportion to the number of antennas available to the transmitter/receiver. However, if the channel information needs to be fed back, the increase of the antennas in numbers means as much feedback information.

Hence, there is a need for increasing channel capacity, thereby reducing feedback information.

The above channel capacity increasing methods are applied to an HSDPA (High Speed Downlink Packet Access) mobile communication system.

FIG. 2 is a block diagram of a transmitter in an HSDPA mobile communication system. Referring to FIG. 2, the transmitter includes a tail bit generator 40, a channel encoder 42, a rate matcher 44, an interleaver 46, a modulator 48, a controller 50, a serial to parallel (S/P) converter 52, and an array of transmission/reception antennas 54, 56, 58, and 60.

The tail bit generator 40 adds tail bits to each of N transport blocks. The channel encoder 42 encodes the transport blocks received from the tail bit generator 40 at a predetermined code rate such as ½ or ⅓ by predetermined coding. The channel encoder 42 can be configured that it has a code rate ⅕ or ⅙ mother encoder and punctures or repeats the coded bits from the mother encoder to thereby support a plurality of code rates. In this case, selection of one of the code rates is important and performed in the controller 50.

The rate matcher 44 matches the rate of the coded bits to an intended rate. Rate matching is required when transport channels are to be multiplexed or the number of the coded bits output from the channel encoder 42 is different from the number of bits transmittable on a physical channel. The interleaver 46 interleaves the rate-matched bits and the modulator 48 modulates the interleaver output in a predetermined modulation scheme. The S/P converter 52 converts a serial modulation symbol sequence received from the modulator 48 to parallel sequences suitable for multi-transmission. The converted parallel sequences are transmitted through the transmission antennas 54, 56, 58, and 60.

The controller 50 controls the coding and modulation according to the current radio channel condition. In an HSDPA mobile communication system, the controller 50 adopts an AMCS (Adaptive Modulation and coding Scheme) by selectively using QPSK, 8PSK, 16QAM, and 64QAM. Though not shown in FIG. 2, a CDMA mobile communication system uses Walsh codes W for channelization and PN (Pseudo Noise) codes for identifying a transmitting Node B (BS).

The coded bits output from the channel encoder 42 can be classified into systematic bits and parity bits. The systematic bits and the parity bits differ in their influence on reception performance. If errors are generated at the same rate in the systematic bits and the parity bits, the errors of the systematic bits influence the overall performance of the mobile communication system more seriously then those of the parity bits. If the same error rate is maintained as a whole and more errors are generated in the parity bits than in the systematic bits, the receiver decodes more accurately than in the opposite case. It is because systematic bits substantially influences the decoder and parity bits are just added to compensate for errors generated during data transmission.

The interleaver 46 interleaves regardless of the priority levels of the systematic bits and the parity bits. That is, the conventional transmitter mixes the systematic bits and parity bits without discrimination and distributes them to the antennas. In this case, if the transmission antennas have different transmission capabilities and as a result, the transmission capability of a particular transmission antenna is small, errors are generated at similar rates in the systematic bits and the parity bits, which may affect the entire system performance. That is, the system performance may be deteriorated more seriously than when errors are generated only in the parity bits. Therefore, there is a need for increasing the entire system performance by decreasing the error rate of the systematic bits, taking into account the channel status of a signal transmitted from each transmission antenna.

SUMMARY OF THE INVENTION

It is, therefore, a first object of the present invention to provide a data transmitting/receiving apparatus including an antenna array and a method thereof to increase an overall performance of a mobile communication system.

It is a second object of the present invention to provide a novel data transmitting/receiving apparatus and method for increasing reception reliability in a mobile communication system having an antenna array.

A third object of the present invention is to provide an apparatus and method for transmitting/receiving data bits/symbols with a higher priority level through an antenna at a good condition and data bits/symbols with a lower priority level through an antenna at a poor condition.

A fourth object of the present invention is to provide a data transmitting/receiving apparatus and method in which whole transmission data is classified into different transmission data groups according to service types or data types and assigning the transmission data groups to antennas at different conditions.

A fifth object of the present invention is to provide an apparatus and method for transmitting/receiving data bits more significant to a receiver, like systematic bits, through an antenna at a good condition and data bits less significant to the receiver, like parity bits, through an antenna at a poor condition.

A sixth object of the present invention is to provide an apparatus and method for determining the type of data to be assigned to each transmission antenna according to its assigned power in an antenna array.

A seventh object of the present invention is to provide an apparatus and method for transmitting a data group having a larger amount of data bits more significant to a receiver, like systematic bits, through an antenna at a good condition when the data bits more significant to a receiver are multiplexed with data bits less significant to the receiver, like parity bits, for transmission.

An eighth object of the present invention is to provide an apparatus and method for multiplexing some of the systematic bits with parity bits prior to transmission if the number of the systematic bits is larger than that of the parity bits.

A ninth object of the present invention is to provide an apparatus and method for transmitting at least two systematic bits and parity bits simultaneously using a plurality of transmitting/reception antennas.

A tenth object of the present invention is to provide an apparatus and method for pairing transmission antennas for STTD (Space Time Transmit Diversity), transmitting the higher prior data encoded by a STTD encoder—through a pair of antennas at a good transmission status, and transmitting the lower prior data encoded by the other STTD encoder—through a pair of antennas at a poor transmission status.

An eleventh object of the present invention is to provide an apparatus and method for separating coded bits into systematic bits and parity bits, interleaving them separately, and transmitting the interleaved bits through different antennas, when a plurality of systematic bits and a plurality of parity bits are transmitted.

A twelfth object of the present invention is to provide an apparatus and method for interleaving data in a different interleaving pattern at each of a plurality of interleavers.

A thirteenth object of the present invention is to provide a data transmitting apparatus and method in which data to be transmitted through each transmission antenna is modulated independently by a predetermined modulation scheme when data with different priority levels is transmitted through different transmission antennas.

To achieve the above and other objects, there is provided a data transmitting/receiving apparatus and method using an antenna array in a mobile communication system. According to one aspect of the present invention, a Node B measures a transmission status of each transmission antenna, classifies transmission data according to priority, and transmits to a UE high-priority data through a transmission antenna at a relatively good transmission status and low-priority data through a transmission antenna at a relatively poor transmission status.

According to another aspect of the present invention, a Node B measures the transmission status of each transmission antenna, and transmits information about the transmission statuses to a UE on channels established between them. Thus, both the Node B and the UE share information about transmission data assigned to each transmission antenna.

According to a further aspect of the present invention, a UE measures the statuses of channels received through antennas and feeds back information about the channel statuses to a BS. Then, the Node B transmits data with different priority levels through different transmission antennas according to the feedback information.

According to yet another aspect of the present invention, a UE transmits to a Node B feedback information about a transmission status of each transmission antenna in the BS. Then the Node B assigns data with different priority levels to transmission antennas and transmits information about the data transmission to the MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides embodiments of a method and an apparatus for increasing the reception reliability of transmission data in a mobile communication using multiple transmission/reception antennas for space transmit diversity. For the purpose of increasing a reception performance of whole data transmitted on a radio channel and thus increasing overall system performance, a transmitter transmits more important data through an antenna at a good radio transmission status and less important data through an antenna at a poorer radio transmission status. Data importance, that is, data priority is determined according to the influence of data on data reception in a receiver. That is, a higher priority level is assigned to more influential data and a lower priority level is assigned to less influential data in receiving the whole data.

As described above, transmission data is classified into different data groups according to priority levels of the data. The data priority is determined according to service type, data type, and a type of channel-coded bits.

The priority level is determined according to service type when different services such as voice and data services are transmitted simultaneously. The data of a data service requiring a low error rate is assigned to a data group with a high priority level. On the contrary, the data of a voice service allowing a relatively high error rate is assigned to a data group with a low priority level.

Systematic bits are assigned to a data group with a high priority level, while parity bits are assigned to a data group with a low priority level. This falls into determination of priority according to the type of channel-coded bits.

Figure 1:
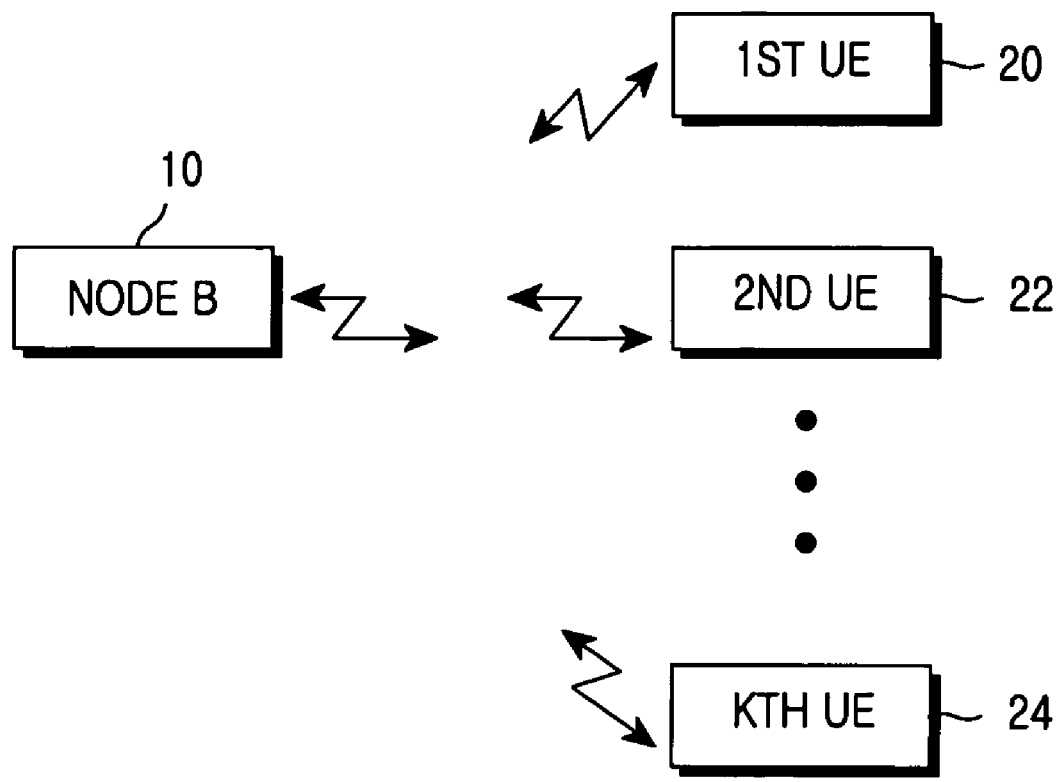
FIG. 1 is a schematic block diagram of a typical mobile communication system having a transmission/reception antenna array.
Figure 2:
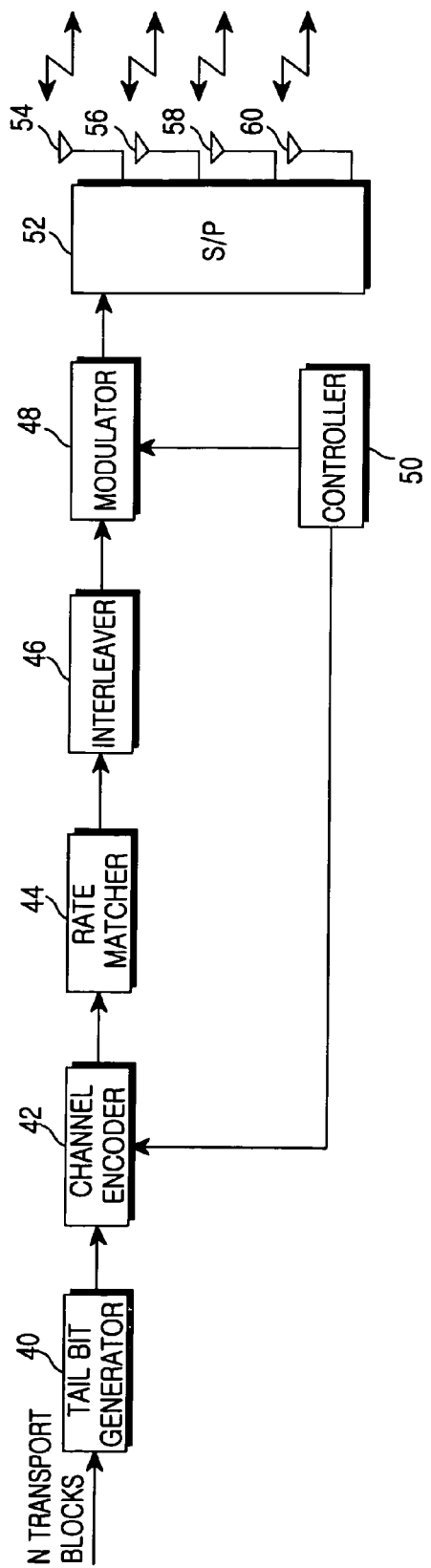
FIG. 2 is a block diagram of a transmitter in a conventional mobile communication system having an antenna array.

As illustrated in FIG. 1, a typical mobile communication system includes a Node B 10 and a plurality of (k) UEs 20, 22, and 24. In the present invention, a Node B and a UE each have a plurality of spaced transmission/reception antennas. The transmission/reception antennas collectively form an antenna array. Thus, the Node B transmits data via the transmission antenna array and the UE then receives the data via the reception antenna array. For such data transmission, the Node B determines the priority level of data to be transmitted through each transmission antenna and also determines the radio transmission status of each transmission antenna according to transmission status measurements made by the Node B or according to feedback information about the transmission status received from the MS. The radio transmission status is equivalent to transmission reliability. The Node B assigns a plurality of data groups to the transmission antennas according to the priority levels of the data groups and the transmission statuses of the transmission antennas. Specifically, the Node B assigns a data group with a high priority level to a transmission antenna at a good transmission status and a data group with a low priority level to a transmission antenna at a poor transmission status.

The radio transmission statuses of the transmission antennas can be determined in various ways. In one embodiment, the Node B measures the transmission status of each transmission antenna and assigns the data groups to the transmission antennas according to the transmission status measurements. In another embodiment, the UE measures the statuses of channels established between the UE and the Node B and feeds back information about the transmission statuses to the BS.

According to the present invention, whole transmission data is classified into as many data groups as there are transmission antennas and the data groups are assigned to the transmission antennas variably according to their transmission statuses. While a conventional mobile communication system indiscriminately transmits more significant data and less significant data in terms of reception performance without assessing the priority of transmission data and increases a probability of losing the more significant data, the probability in the proposed scheme is decreased, which improves system performance and channel capacity in the present invention.

In four embodiments of the present invention described below, data priority is determined according to the types of coded bits, that is, systematic bits or parity bits. The Node B channel-encodes transmission data and classifies the coded bits into different data groups according to how far they affect reception performance. The data groups are assigned on a one-to-one basis to transmission antennas according to the transmission status of the antennas.

If the rates of high-priority data and low-priority data with respect to the whole transmission data are different, one data group is multiplexed with another data group with a different priority level and transmitted through a transmission antenna. In this case, a data group having relatively more high-priority data is transmitted through a transmission antenna at a good transmission status. As described before, the four embodiments of the present invention are defined according to the transmission status of each transmission antenna and whether a Node B transmits transmission antenna assignment information to a UE or not.

For ease of description of the present invention, the following is assumed.

A channel encoder encodes data at a code rate of ½ and ¾, and QPSK, 8PSK, 16QAM and 64QAM are all or partially supported.

TABLE 1

| Code Rate | Modulation |
|---|---|
| 1/2 | QPSK |
| | 8PSK |
| | 16QAM |
| | 64QAM |
| 3/4 | QPSK |
| | 8PSK |
| | 16QAM |
| | 64QAM |

When the code rate is ½, the channel encoder outputs two coded bits for the input of one bit. In this case, one of the two coded bits is a systematic bit being pure user data and the other is a parity bit. If the code rate is ¾, the channel encoder outputs four coded bits for the input of three bits. Three of the four coded bits are systematic bits and the other one bit is a parity bit.

As described above, the present invention pertains to a mobile communication system using a multi-antenna array, that is, a transmission antenna array. The transmission antenna array transmits transmission frame data through a plurality of transmission antennas. Since data from each transmission antenna is transmitted on a different radio channel, the transmission antennas are at different transmission statuses. In the case of two transmission antennas, their transmission patter is [H, L] or vice versa. In the case of four transmission antennas, their transmission status pattern is [H, M, M, L], [H, M, L, L], [H, L, M, L, L], [H, L, x, x], or [1, 2, 3, 4]. H in the patterns represents a good (or High) transmission status, M represents a moderate transmission status, and L represents a poor (or Low) transmission status. A good transmission status or high transmission reliability is equivalent to a low error rate. x in the patterns represents a transmission status that is too poor to transmit data. 1, 2, 3, 4 indicates the order of relative transmission statuses. Whether a transmission status pattern is expressed with H, M, and L, or 1, 2, 3 and 4, transmission antennas at the two best transmission statuses transmit systematic bits and the other two transmission antennas transmit parity bits. That is, more significant data (e.g., systematic bits or control information bits) is assigned to a transmission antenna at a good transmission status, and less significant data (e.g., parity bits), to a transmission antenna at a lower transmission status. Therefore, system performance is increased.

For example, if a code rate is ½, systematic bits and parity bits are generated at the same rate, and a transmission status pattern is [H, x, x, L], the systematic bits are transmitted through a transmission antenna at a transmission status H (hereinafter, referred to as an H-transmission antenna) and the parity bits are transmitted through a transmission antenna at a transmission status L (hereinafter, referred to as an L-transmission antenna). The transmitter can apply the same channel interleaving and modulation to data in the same data group. The receiver can apply a different channel interleaving and a different modulation if it knows beforehand the channel interleaving and modulation used in the transmitter.

If a code rate is ¾, for the input of three input information bits, three 1-systematic bit streams and a 1-parity bit stream are generated. When a transmission pattern is [H, M, M, L] for four transmission antennas, the three information bit streams are transmitted through one H-transmission antenna and two M-transmission antennas. The parity bit stream is transmitted through one L-transmission antenna.

Even if the number of transmission antennas is increased, information bit streams and parity bit streams are distributed to the transmission antennas according to their transmission statuses.

In a mobile communication system according to the present invention, a channel encoder, a demodulator, and a channel estimator & transmission antenna assigner generate transmission data and determine data for each transmission antenna. A transmission antenna array in a Node B transmits data groups classified according to the degrees of influence on reception performance in a radio channel environment, and a reception antenna array in a UE receives the data transmitted from the transmission antenna array. Here, the transmission status of each transmission antenna is measured by the Node B or the MS. In the latter case, the UE transmits feedback information about the transmission status to the Node B on an uplink channel.

The Node B determines the transmission status of each transmission antenna according to its measurements or the feedback information. The order of the transmission statuses is a criterion by which the data groups are assigned to the transmission antennas. In transmitting the data groups, the Node B transmits a common pilot channel signal along with the data to the UE so that the UE can discriminate the transmission antennas.

When the UE transmits to the Node B feedback information about the order of the transmission antennas according to their transmission statuses, the Node B determines the transmission status of each transmission antenna based on the feedback information and distributes the code symbols of the next frame to the transmission antennas. Since the UE transmitted the feedback information, it can discriminate the code bits of the next frame according to their transmission antennas. Therefore, the UE can demultiplex and decode signals from the transmission antennas.

Hereinbelow, embodiments of the present invention will be described.

1. First Embodiment

In a first embodiment of the present invention, a transmitter determines a transmission status of each transmission antenna in a transmission antenna array and transmits data according to the transmission statuses. A receiver determines a reception status of each reception antenna in a reception antenna array and receives data according to the reception statuses.

For the above operations, the mobile communication system is configured and operated as follows.

(1) The transmission status of each transmission antenna in the transmission antenna array is measured and control information corresponding to the transmission status is generated.

(2) The transmission antennas are classified into data groups according to priority and the data groups are assigned to the transmission antennas according to the control information.

(3) The status of each downlink channel is measured using a received signal and a signal received through each reception antenna in a reception antenna array is recovered according to the transmission status measurement.

In this embodiment, a Node B performs channel estimation in TDMA (Time Division Multiple Access), while in FDMA (Frequency Division Multiple Access), a Node B measures the status of uplink channels and predicts the status of downlink channels based on the uplink channel status.

The first embodiment of the present invention will be described referring to FIGS. 3 to 10.

1.1 Transmitter

Figure 3:
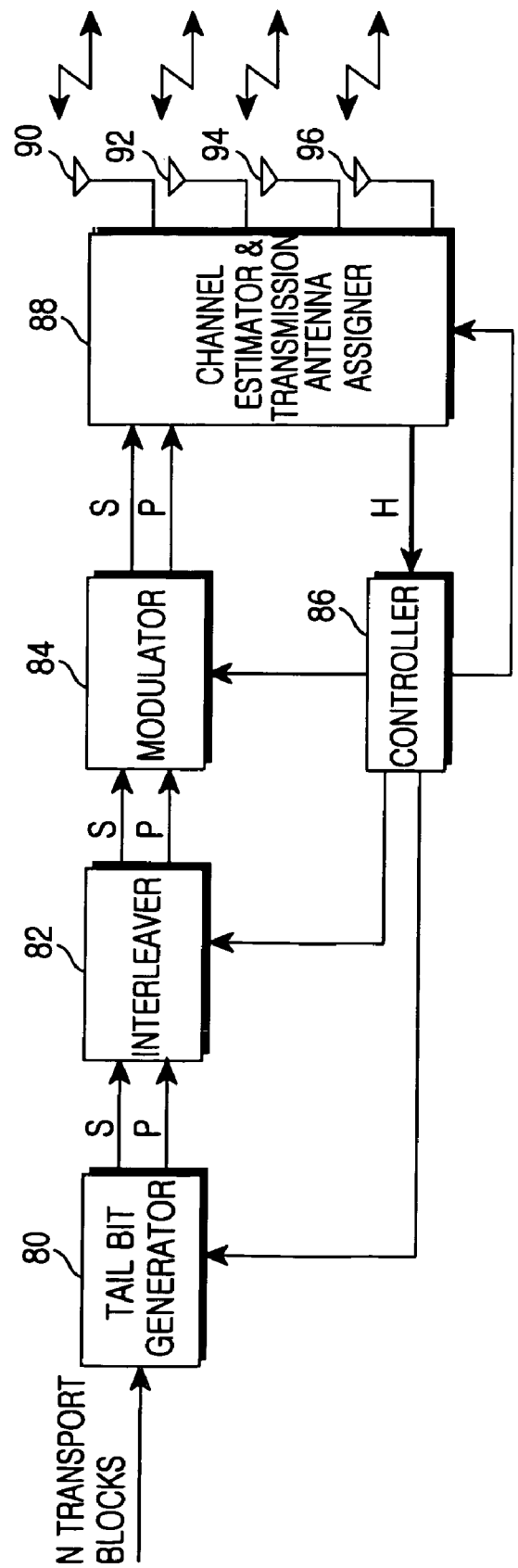
FIG. 3 is a block diagram of a transmitter in a mobile communication system according to an embodiment of the present invention.

FIG. 3 is a block diagram of a transmitter in a mobile communication system according to the first embodiment of the present invention. Components common to all the embodiments will first be described. Referring to FIG. 3, the Node B 10 measures the transmission statuses of transmission antennas 90, 92, 94, and 96 in a transmission antenna array in a method determined by CAI (Common Air Interface).

A channel encoder 80 receives N transport blocks, encodes the data at a predetermined code rate provided by a controller 86, and outputs systematic bits S and parity bits P. If the code rate is ½, the channel encoder 80 outputs the systematic bits S and the parity bits P at a one to one ratio. On the other hand, if the code rate is ¾, the systematic bits S and the parity bits P are at a three to one ratio.

An interleaver 82 interleaves the systematic bits S and the parity bits P separately. The interleaver 82 can be configured to have a plurality of internal interleavers. When the single interleaver 82 is used, the systematic bits S and then the parity bits P are interleaved, or in the opposite order. In this case, a buffer is required to temporarily store the parity bits P during interleaving the systematic bits S. When a plurality of interleavers are used, it is possible to interleave the systematic bits S and the parity bits P independently.

A modulator 84 modulates the interleaver output in a predetermined modulation scheme. The same modulation or different modulations can be applied to the systematic bits S and the parity bits P. For example, both the interleaved systematic bits S and the parity bits P are modulated by QPSK, or the interleaved systematic bits S and the parity bits P are modulated by QPSK and 16QAM, respectively. Hereinafter, modulation symbols obtained by modulating the systematic bits S and the parity bits P are referred to as systematic modulation symbols and parity modulation symbols, respectively. A channel estimator & transmission antenna assigner 88 estimates the transmission statuses of transmission channels established in correspondence with the respective transmission antennas 90, 92, 94, and 96. In time duplexing, the transmission statuses of transmission channels can be estimated by measuring those of the reception channels.

The channel estimator & transmission antenna assigner 88 reports the transmission status of the transmission channels H to the controller 86. Meanwhile, the channel estimator & transmission antenna assigner 88 classifies the systematic modulation symbols S and the parity modulation symbols P into data groups corresponding to the transmission antennas 90, 92, 94, and 96 and distributes modulation symbols in the data groups to corresponding transmission antennas under the control of the controller 86. For example, if the first and second transmission antennas 90 and 92 are good transmission statuses and the third and fourth transmission antennas 94 and 96 are at poor transmission statuses, the channel estimator & transmission antenna assigner 88 assigns data groups having the systematic modulation symbols S to the first and second transmission antennas 90 and 92 and data groups having the parity modulation symbols P to the third and fourth transmission antennas 94 and 96.

The controller 86 controls the channel estimator & transmission antenna assigner 88 to appropriately assign the data groups to corresponding transmission antennas based on the transmission status information H.

While the channel estimator & transmission antenna assigner 88 assigns transmission data according to priority in the above description, it can be further contemplated that the classification of data occurs before modulation, or before interleaving.

Though not illustrated in FIG. 3, a rate matcher can be further provided to the transmitter, for controlling a data rate at the output of the channel encoder 80 by puncturing or repeating coded bits.

If the data classification is carried out after encoding or interleaving, the modulator 84 modulates data according to the data groups. In this case, the same modulation or different modulations can be applied to the data groups. The channel estimator & transmission antenna assigner 88 simply distributes modulation symbols in the data groups to corresponding transmission antennas under the control of the controller 86.

Figure 4:
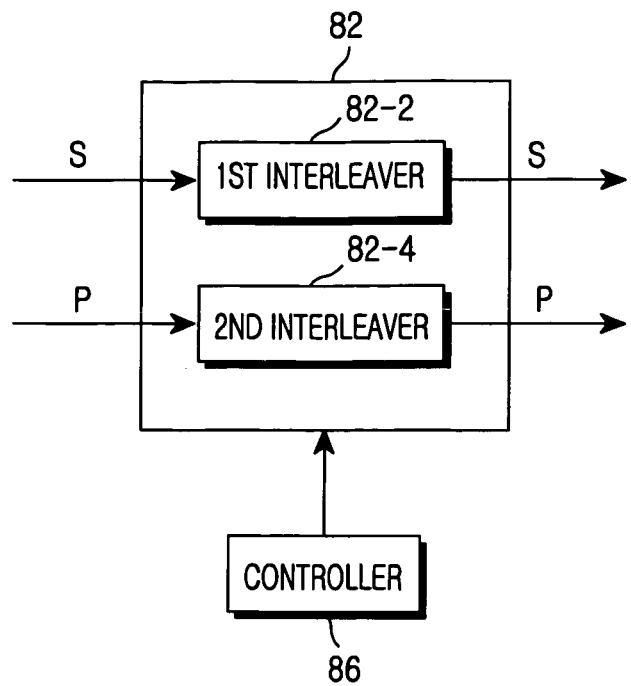
FIG. 4 is a detailed block diagram of an interleaver illustrated in FIG. 3.

FIG. 4 is a block diagram of the interleaver 82 when it includes a plurality of internal interleavers. A systematic bit stream and a parity bit stream discriminately output from the channel encoder are assigned to internal interleavers 82-2 and 82-4, respectively, for separate interleaving.

Referring to FIG. 4, the first and second interleavers 82-2 and 82-4 interleave the systematic bit stream and the parity bit stream, respectively, in interleaving patterns provided by the controller. Thus the interleaved systematic and parity bit streams are applied separately to the input of the modulator 84.

However, if the coded bits are classified into data groups before interleaving, a new interleaver must be used. That is, an interleaver is prepared for each data group, or interleaving is carried out as many time as the number of transmission antennas in a single interleaver. After the independent interleaving of each data group, the interleaver distributes the interleaved bits to corresponding transmission antennas. Here, the same interleaving pattern or different interleaving patterns are available in interleaving the data groups separately. The interleaving pattern or patterns are preset between the transmitter and the receiver.

Figure 5:
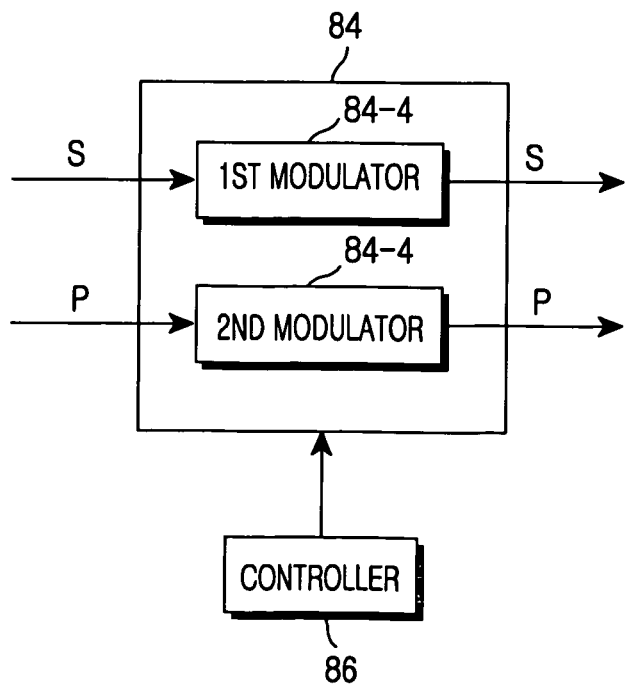
FIG. 5 is a detailed block diagram of a modulator illustrated in FIG. 3.

FIG. 5 is a block diagram of the modulator 88 when it includes a plurality of internal modulators. The interleaved systematic and parity bit streams discriminately output from the interleaver 82 are assigned to internal modulators 84-2 and 84-4, respectively, for separate modulation. The modulators 84-2 and 84-4 may use the same modulation scheme or different modulation schemes. It is also possible to sequentially modulate the interleaved systematic and parity bit streams with the use of a single modulator.

Referring to FIG. 5, the first and second modulators 84-2 and 84-4 modulate the interleaved systematic and parity bit streams, respectively, in predetermined modulation schemes provided by the controller 86. Thus the systematic and parity modulation symbols are applied separately to the input of the channel estimator & transmission antenna assigner 88.

However, if data classification occurs before interleaving or before modulation, a new modulator must be used correspondingly. That is, a modulator is prepared for each data group, or modulation is carried out as many time as the number of transmission antennas in a single modulator. After the independent modulation of each data group, the modulator distributes the modulation symbols to corresponding transmission antennas.

Figure 9:
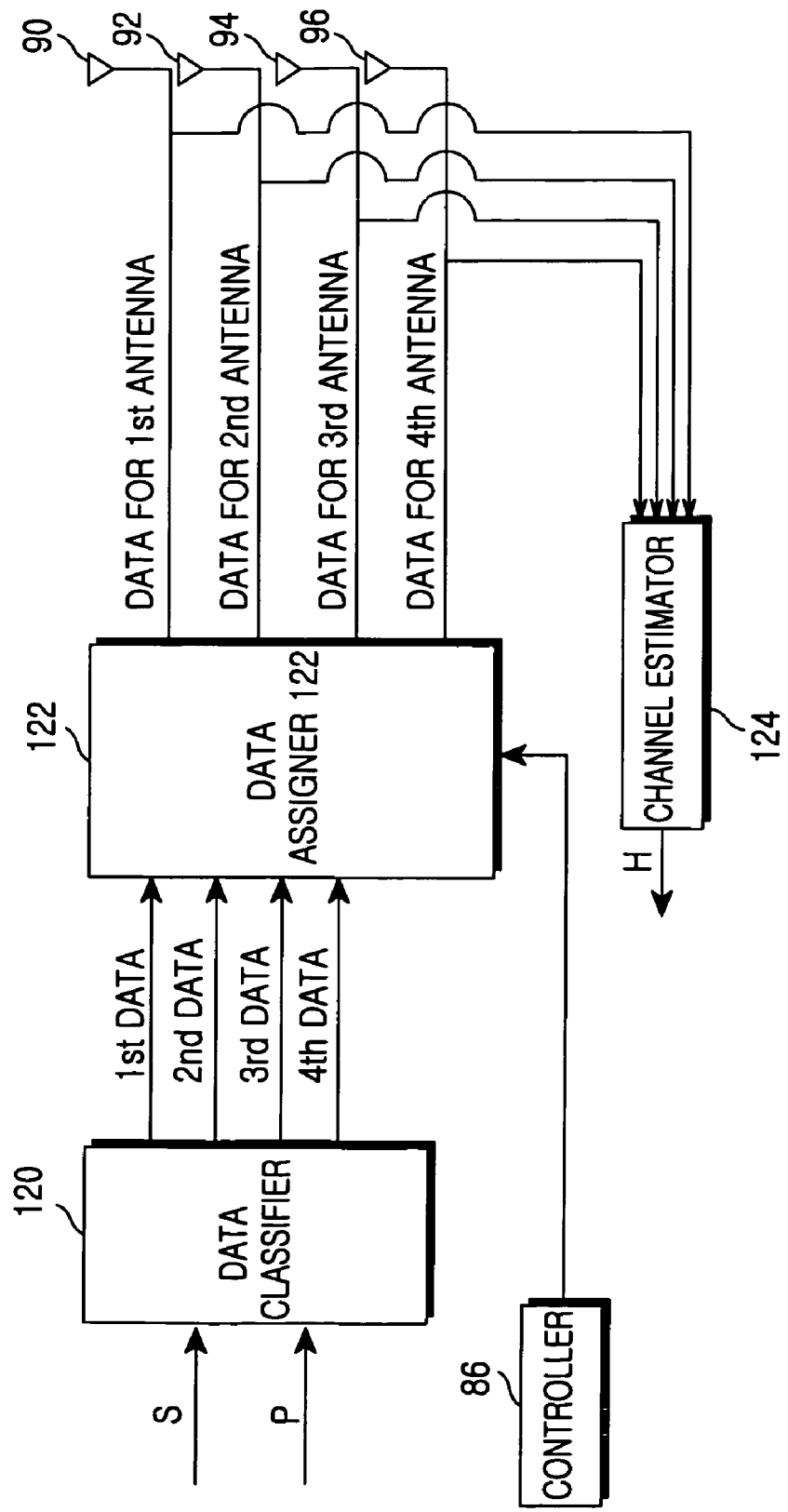
FIG. 9 is a detailed block diagram of a channel estimator & transmission antenna assigner illustrated in FIG. 3.

FIG. 9 is a detailed block diagram of the channel estimator & transmission channel assigner 88 illustrated in FIG. 3. Referring to FIG. 9, a data classifier 120 classifies the systematic modulation symbols and parity modulation symbols separately received from the modulator 84 to as many data groups as there are transmission antennas according to the priority levels of the modulation symbols and then determines the order of the data groups to assign the data groups to the transmission antennas 90, 92, 94, and 96 according to their transmission statuses. Thus the data classifier 120 outputs data by data group, that is, first to fourth data of first to fourth data groups in a descending priority order.

A data assigner 122 maps the data groups to the transmission antennas 90, 92, 94, and 96 on a one-to-one basis according to the priority levels of the data groups and the transmission statuses of the transmission antennas. Information about the transmission statuses is provided by the controller 86. A higher-priority data group is mapped to a transmission antenna at a better transmission status, and a lower-priority data group is mapped to a transmission antenna at a worse transmission status.

Figure 10:
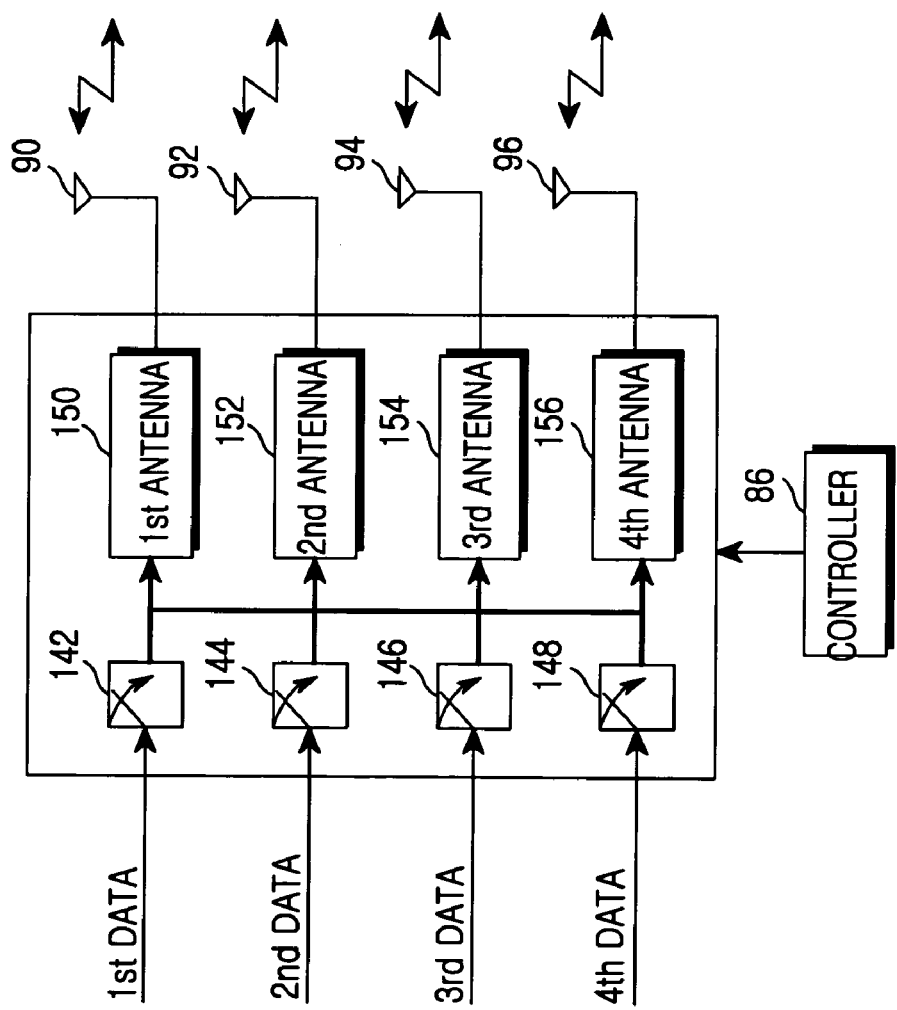
FIG. 10 is a detailed block diagram of a data assigner illustrated in FIG. 9.

FIG. 10 is a detailed block diagram of the data assigner 122 illustrated in FIG. 9. Referring to FIG. 10, four switches 142, 144, 146, and 148 receive the four data groups of which the priority levels are determined by the data classifier 120. Each of the switches 142, 144, 146, and 148 has one input port and four output ports. The output ports of each switch are connected to the four antennas 90, 92, 94, and 96. The switches 142, 144, 146, and 148 switch data groups to corresponding antennas according to control information corresponding to the transmission statuses of the antennas received from the controller 86. Different control information may be provided to each switch. Therefore, a switch receiving a data group with a high priority switches the data group to a transmission antenna at a good status and a switch receiving a data group with a low priority switches the data group to a transmission antenna at a poor status. Buffers or transmission lines are used to connect the data groups to the transmission antennas 90, 92, 94, and 96.

1.2 Receiver

Figure 6:
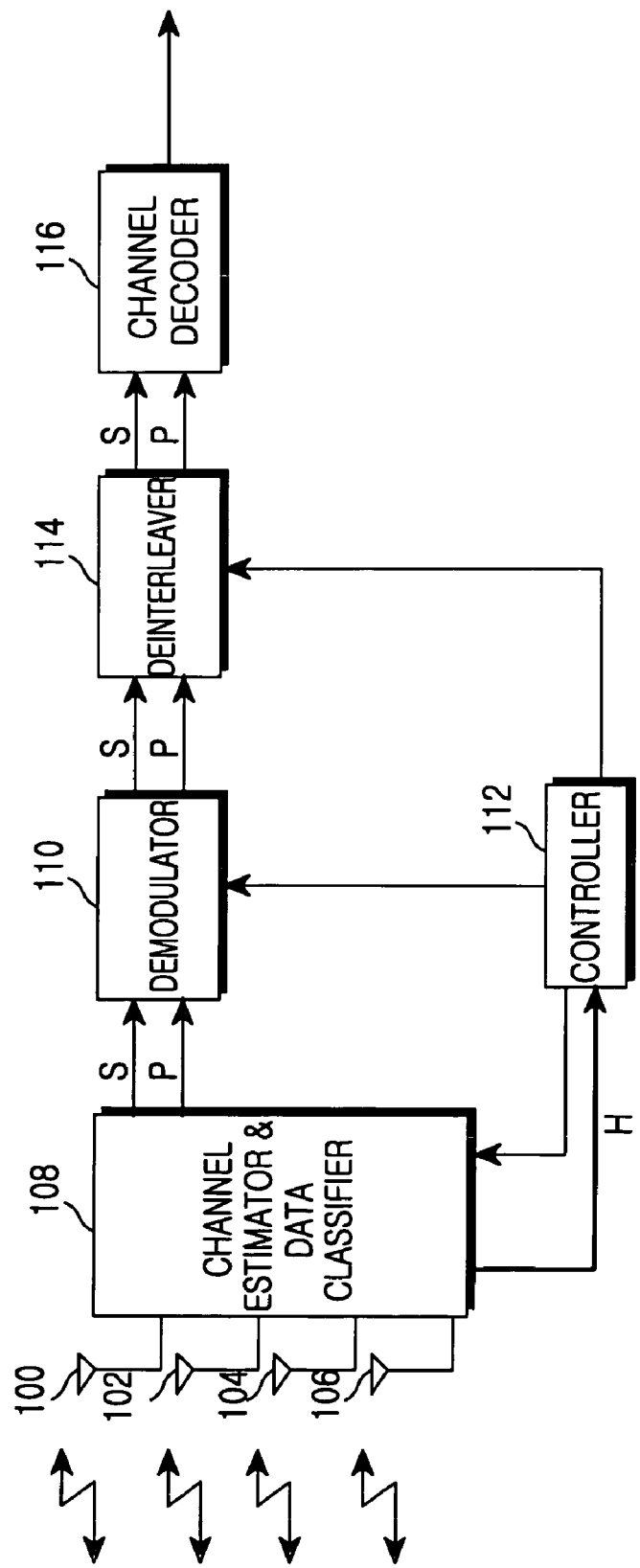
FIG. 6 is a block diagram of a receiver corresponding to the transmitter illustrated in FIG. 3.

FIG. 6 is a block diagram of a receiver corresponding to the transmitter illustrated in FIG. 3. Referring to FIG. 6, the transmission data transmitted through the transmission antennas 90, 92, 94, and 96 are received in the receiver through reception antennas 100, 102, 104, and 106. The received signals are fed to a channel estimator & data classifier 108. The channel estimator & data classifier 108 estimates the transmission statuses of downlink channels corresponding to the reception antennas 100, 102, 104, and 106 and transmits the transmission status information H to a controller 112. The channel estimator & data classifier 108 also classifies the received signals according to the data groups that are mapped to the transmission antennas in the transmitter, multiplexes the data groups, and outputs high-priority modulation symbols and low-priority modulation symbols discriminately. The high-priority modulation symbols and low-priority modulation symbols are systematic modulation symbols and parity modulation symbols, respectively.

A demodulator 110 separately demodulates the systematic modulation symbols and the parity modulation symbols in a demodulation scheme provided by a controller 112 in correspondence with the modulation scheme adopted in the transmitter. The demodulator 110 can apply the same demodulation or different demodulations to the systematic and parity modulation symbols depending on whether the modulator of the transmitter uses the same modulation or different modulations.

A deinterleaver 114 separately deinterleaves systematic bits and parity bits discriminately received from the demodulator 110 in an interleaving pattern received from the controller 112. The controller 112 knows the interleaving pattern used in the interleaver of the transmitter. The interleaving pattern is a standardized one or transmitted to the receiver as system information before communication.

Finally, a channel decoder 116 decodes the deinterleaved systematic and parity bit streams by a predetermined decoding corresponding to the encoding in the transmitter.

Figure 7:
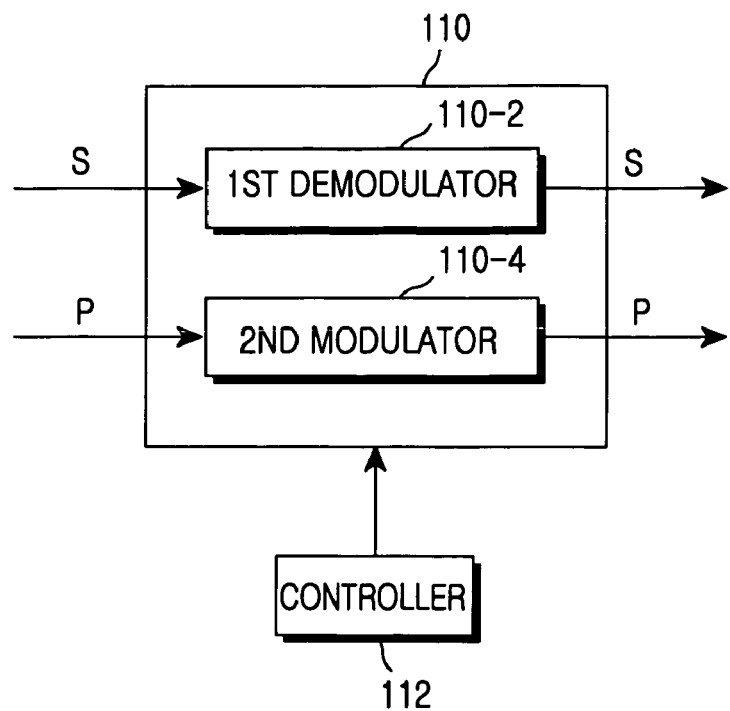
FIG. 7 is a detailed block diagram of a demodulator illustrated in FIG. 6.

FIG. 7 is a detailed block diagram of the demodulator 110 illustrated in FIG. 6 including a plurality of internal demodulators. The demodulator 110 assigns internal demodulators 110-2 and 110-4 the systematic modulation symbols and the parity modulation symbols which have been separated according to their priority levels in the channel estimator & data classifier 108. Therefore, the demodulators 110-2 and 110-4 may use the same demodulation scheme or different demodulation schemes. Or the systematic and parity modulation symbols can be demodulated sequentially by the use of a single demodulator. The first and second demodulators 110-2 and 110-4 demodulate the systematic modulation symbols and the parity modulation symbols received from the channel estimator & data classifier 108 by the same demodulation or different demodulations in correspondence with the modulation method performed in the transmitter under the control of the controller 112. Thus demodulated systematic information bit streams and demodulated parity bit streams are separately fed to the deinterleave 114.

Figure 8:
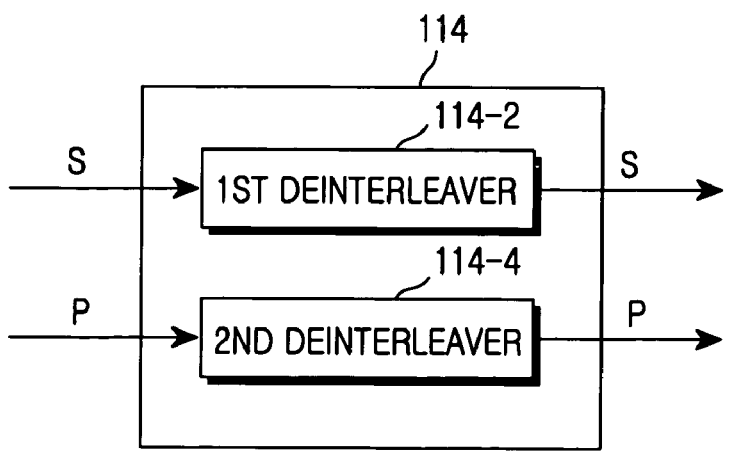
FIG. 8 is a detailed block diagram of a deinterleaver illustrated in FIG. 6.

FIG. 8 is a detailed block diagram of the deinterleaver 114 illustrated in FIG. 6 deinterleaving a plurality of coded bit streams received from the demodulator 110 using internal deinterleavers 114-2 and 114-4. That is, the first and second interleavers 114-2 and 114-4 deinterleave information and parity bit streams, respectively, according to interleaving patterns preset between the transmitter and the receiver.

2. Second Embodiment

In a second embodiment of the present invention, a Node B determines a transmission status of each transmission antenna in an antenna array and transmits the transmission status information to each MS, so that the transmission status information is under the same control in the Node B and the MS. The transmission statuses are determined in a same manner as in the first embodiment of the present invention.

Figure 11:
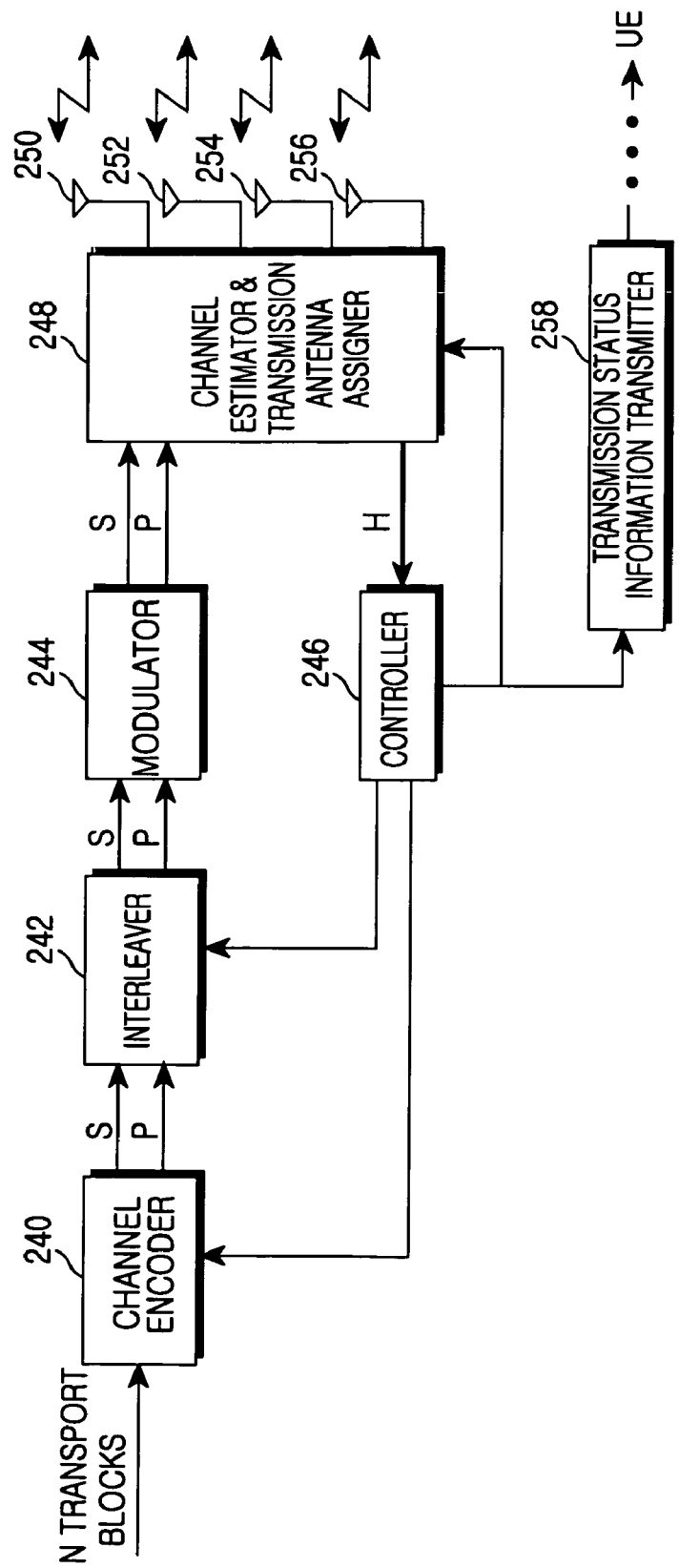
FIG. 11 is a block diagram of a transmitter in a mobile communication system according to another embodiment of the present invention.

FIG. 11 is a block diagram of a transmitter in a mobile communication system according to the second embodiment of the present invention. As illustrated in FIG. 11, the transmitter has a transmission status information transmitter 258 in addition to the components of the transmitter illustrated in FIG. 3. The transmission status information transmitter 258 transmits transmission status information about each transmission antenna received from a controller 246 to the UE through transmission antennas 250, 252, 254, and 256.

Figure 12:
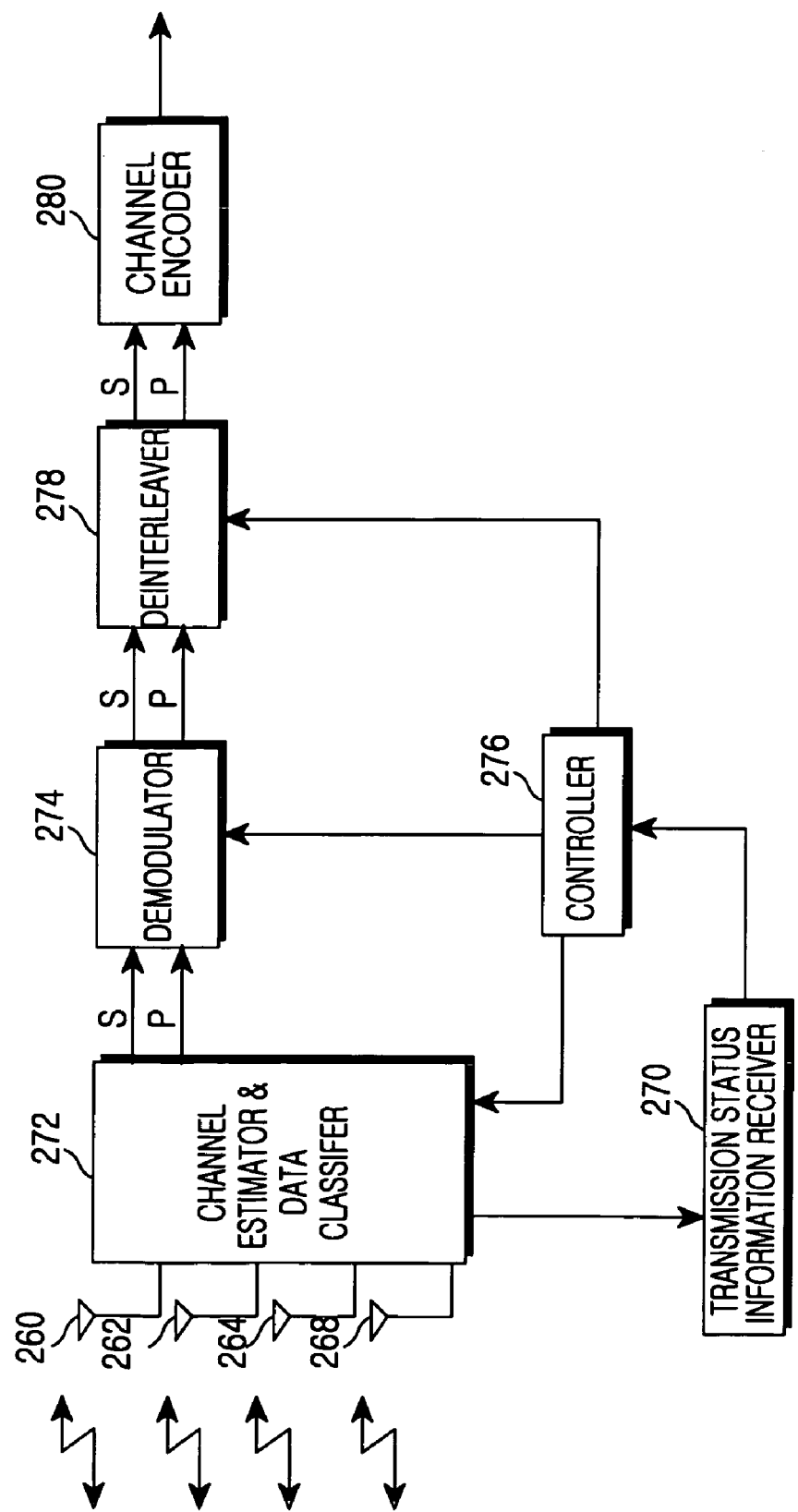
FIG. 12 is a block diagram of a receiver corresponding to the transmitter illustrated in FIG. 11.

FIG. 12 is a block diagram of a receiver corresponding to the transmitter illustrated in FIG. 11. As illustrated in FIG. 12, the receiver has a transmission status information receiver 270 in addition to the components of the receiver illustrated in FIG. 6. The transmission status information receiver 270 provides transmission status information about each transmission antenna received from a data classifier 272 to a controller 276. The controller 276 controls the data classifier 272 to generate two groups of modulation symbols to be input to a modulator 274 according to the transmission status information.

3. Third Embodiment

In a third embodiment of the present invention, each UE determines the statuses of downlink channels received through reception antennas in an antenna array and feeds back the transmission status information to a BS, so that the transmission status information is under the same control in the Node B and the MS.

Figure 13:
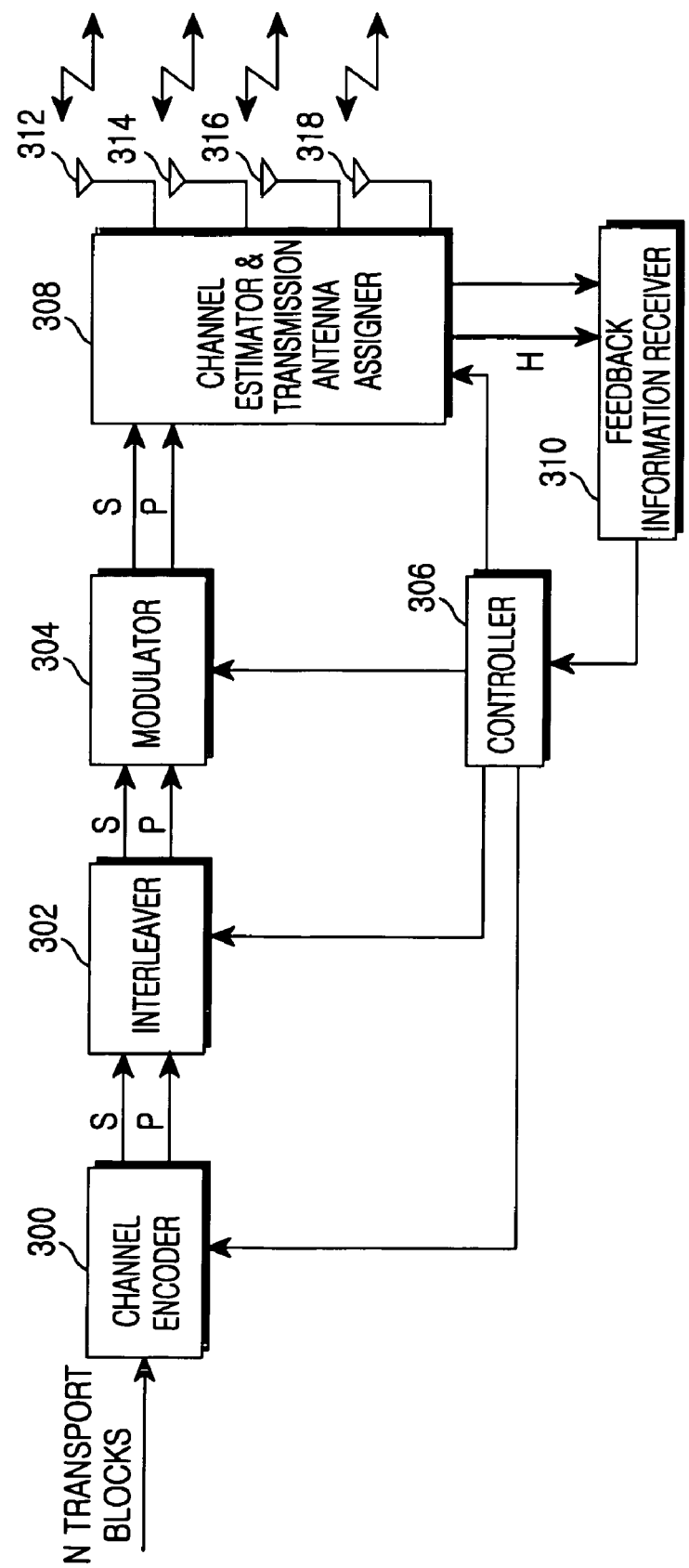
FIG. 13 a block diagram of a transmitter in a mobile communication system according to a third embodiment of the present invention.

FIG. 13 is a block diagram of a transmitter in a mobile communication system according to the third embodiment of the present invention. Referring to FIG. 13, a channel estimator & transmission antenna assigner 308 receives feedback information H about the transmission statuses of transmission antennas 312, 314, 316, and 318 in a transmission antenna array from each UE. A feedback information receiver 310 feeds the transmission status information H to a controller 306. The controller 306 controls a transmission antenna assigner 308 to appropriately assign data groups to the transmission antennas 312, 314, 316, and 318 according to the transmission status information H.

Figure 14:
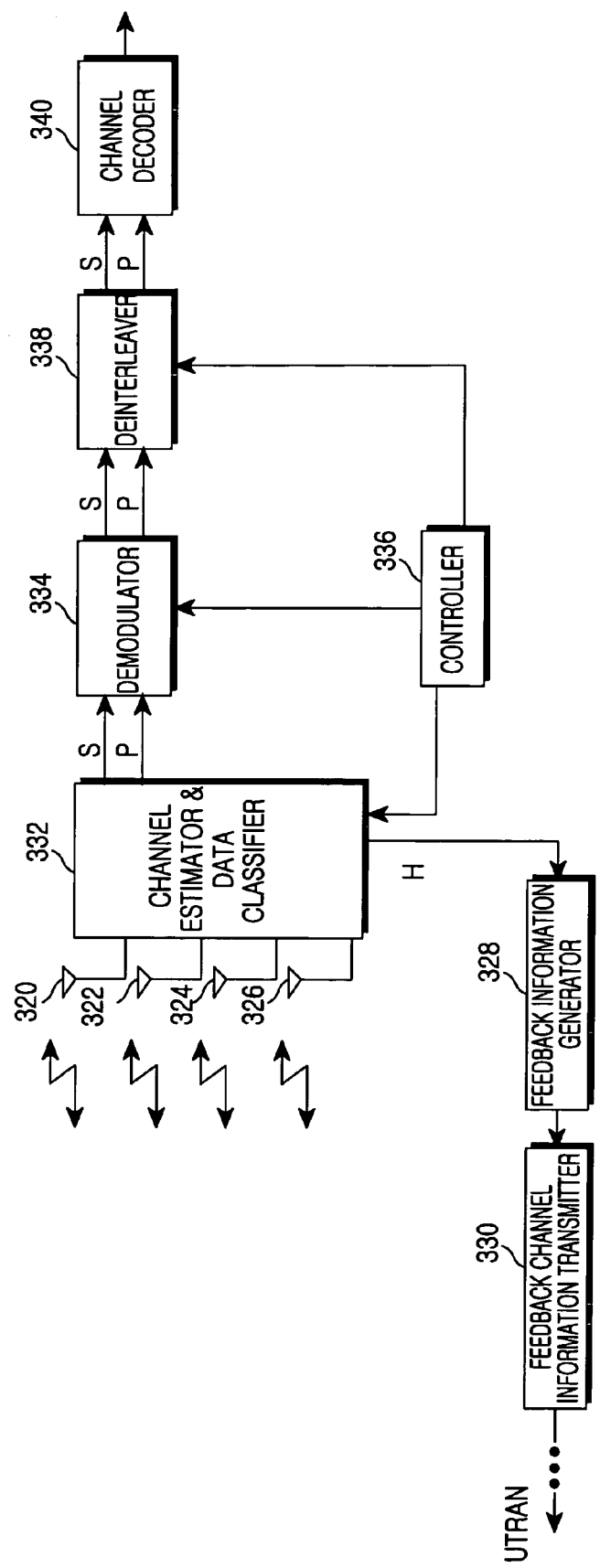
FIG. 14 is a block diagram of a receiver corresponding to the transmitter illustrated in FIG. 13.

FIG. 14 is a block diagram of a receiver corresponding to the transmitter illustrated in FIG. 13. Referring to FIG. 14, a channel estimator & data classifier 332 estimates the transmission statuses of downlink channels corresponding to reception antennas 320, 322, 324, and 326 in a reception antenna array. A feedback information generator 328 generates feedback information based on the transmission status information H received from the channel estimator & data classifier 332. A feedback channel information transmitter 330 converts the feedback information in a suitable format and transmits it to the BS.

Referring to FIGS. 13 and 14, in operation, the channel estimator & data classifier 332 generates the channel information H from signals received through the reception antennas 320, 322, 324, and 326 in the UE (20, 22, . . . , or 24 in FIG. 1). Using the channel information H, the feedback information generator 328 calculates transmission power that the transmitter can assign to each of the transmission antennas 312, 314, 316, and 318, generates control information by which the transmitter assigns data to the transmission antennas 312, 314, 316, and 318, and outputs the control information as feedback information to the feedback channel information transmitter 330. The feedback channel information transmitter 330 transmits the feedback information in a suitable format to the transmitter.

Meanwhile, the transmitter in the Node B 10 receives a signal from the UE 20, 22, . . . , or 24 through the transmission antennas 312, 314, 316, and 318. The channel estimator & transmission antenna assigner 308 estimates the transmission statuses of the antennas using the input signal. The feedback information receiver 310 extracts feedback information indicating the transmission status of each transmission antenna using the input signal and transmission status information received from the channel estimator & transmission antenna assigner 308. The controller 306 controls the channel estimator & transmission antenna assigner 308 according to the feedback information to assign data groups to the transmission antennas 312, 314, 316, and 318.

A description will be made below of measuring downlink channel characteristics in the UE according to the third embodiment of the present invention.

The UE obtains downlink channel characteristics $H_{DL}$ by $$H_{DL} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \quad (1)$$

The downlink channel characteristics $H_{DL}$ are measured in the channel estimator & data classifier 332 and fed to the feedback information generator 328. The feedback information generator 328 generates the feedback information indicating the status of each transmission antenna for the transmitter. In this case, a transmitting/receiving end in a system including an antenna array can be modeled as $$Y(t)=H(t)*X(t)+N(t) \quad (2)$$

where * represents convolution and Y(t), X(t), and N(t) are AWGN (Additive White Gaussian Noise) vectors. Here, $Y(t)=(y_1(t)\ y_2(t)\ \ldots\ Y_{mR}(t))'$ and $X(t)=(x_1(t)\ x_2(t)\ \ldots\ X_{mR}(t))'$.

Meanwhile, the feedback information generator 328 calculates the transmission power of each transmission antenna by Water Pouring to generate the feedback information. This implies that both the transmitter and receiver know channel conditions to thereby increase channel capacity in the transmitter. By the above operation, a MIMO system is changed to a plurality of equivalent SISO (Single Input Single Output) systems through linear conversion. According to the present invention, the MIMO system is converted to a plurality of SISO systems and the transmission power of each single antenna is calculated. The resulting transmission status of each transmission antenna is used to determine which data groups to assign to the transmission antennas 312, 314, 316, and 318.

For this purpose, SVD (Singular Value Deposition) is performed to convert the MIMO systems to the SISO systems by $$H = UDV^H \quad (3)$$

where U and V are singular matrixes and D is a matrix with all zeroes except diagonal components. Since a matrix inverse always exists for a singular matrix, a MIMO channel is divided into as many SISO channels as the smaller number between the number of the transmission antennas and the number of reception antennas by multiplying each of the transmitting and receiving ends by V and $U^H$, respectively. Therefore, $$Y = U^H(HVX+N) \rightarrow Y = DX + U^H N \quad (4)$$

where the diagonal components of the matrix D are the square roots of the singular values of $H^H H$. A term including noise has a distribution same as AWGN. After the operation, SISO systems are produced and the channel capacity of the MIMO system is the sum of the capacities of the SISO systems, which can be calculated by $$C = \sum_{k=1}^{n,M} \log_2(1 + \rho_k \lambda_k) \quad (5)$$

where $\lambda_1, \lambda_2, \ldots, \lambda_{n,m}$ are the singular values of $H^H H$, $\rho_k$ is transmission power available to each transmission antenna, and n and m indicate the number of the transmission antennas 312, 314, 316, and 318 and the number of the reception antennas 320, 322, 324, and 326, respectively. The number of singular values is equal to the smaller number between the numbers of the transmission antennas and the reception antennas, and as many transmission power values as the singular values are generated. The channel capacity of given channels in an antenna array system is maximized through Water Pouring by $$p_k = \frac{1}{\lambda_0} - \frac{1}{\lambda_k} \quad (6)$$

Only if $\lambda_k > \lambda_0$, Eq. (6) is valid and otherwise, assigned transmission power is 0. Here, $\lambda_0$ is a total average power limit. The Water Pouring assigns higher transmission power to a better channel, thereby increasing channel capacity. After the transmission power of each transmission antenna is calculated by Eq. (6), the feedback information generator 328 outputs information indicating the ratio of transmission power assigned to each transmission antenna to overall transmission power to the feedback channel information transmitter 330. The feedback channel information transmitter 330 converts the received information in a predetermined format and transmits it to the Node B 10.

4. Fourth Embodiment

In the fourth embodiment of the present invention, both a transmitter and a receiver determine the statuses of downlink channels established in correspondence with transmission antennas in a transmission antenna array. Thus it is possible to transmit transmission status information from the transmitter to the receiver and vice versa. In this context, the fourth embodiment is a combination of the second and third embodiments.

Figure 15:
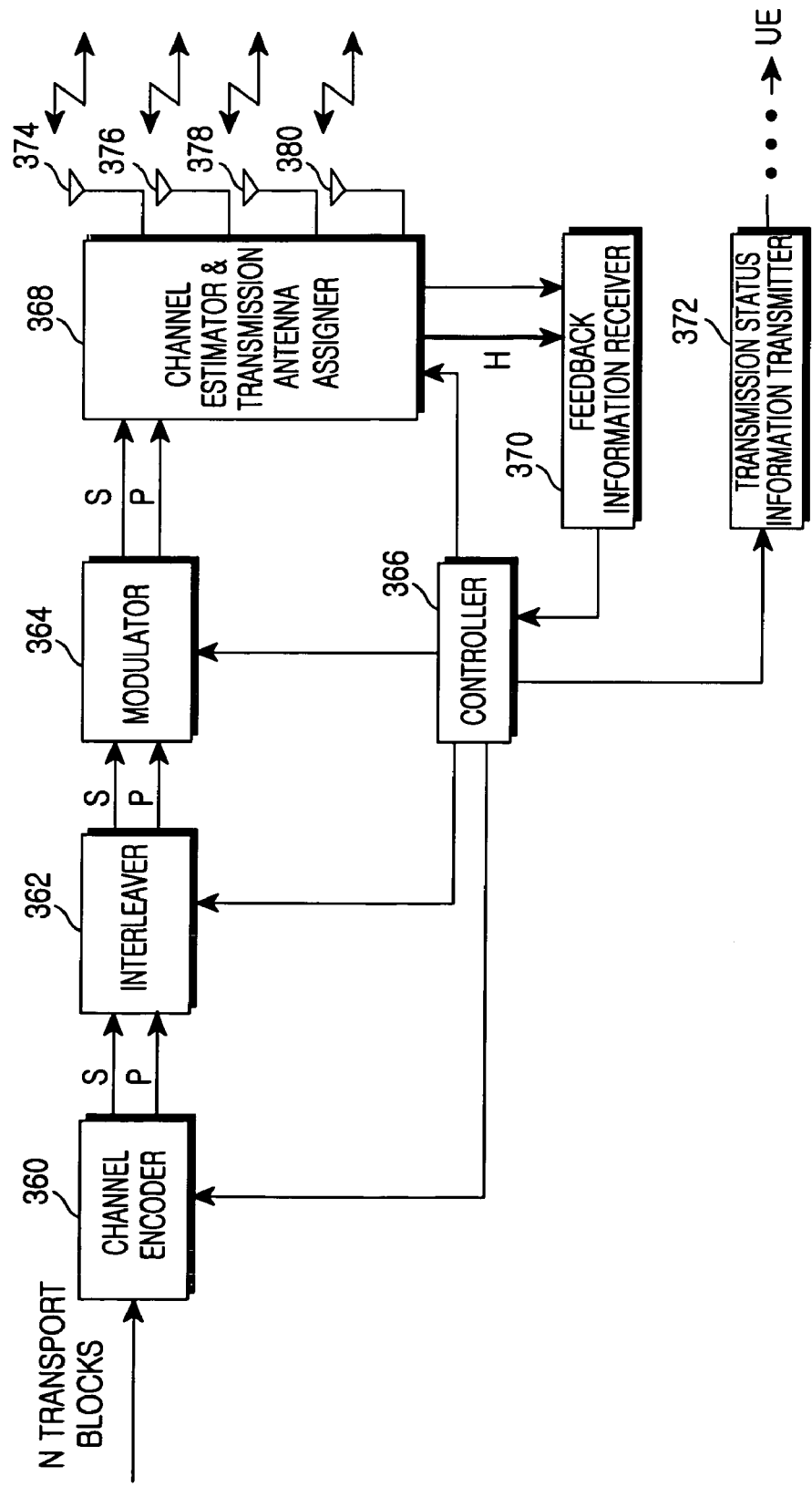
FIG. 15 a block diagram of a transmitter in a mobile communication system according to a fourth embodiment of the present invention.

FIG. 15 is a block diagram of a transmitter in a mobile communication system according to the fourth embodiment of the present invention. As illustrated in FIG. 15, the transmitter includes both a transmission status information transmitter 372 as in the second embodiment and a feedback information receiver 370 as in the third embodiment, so that the Node B can transmit/receive transmission status information to/from UEs.

Referring to FIG. 15, the Node B 10 divides transmission data into a plurality of data groups by priority according to the number of transmission antennas 374, 376, 378, and 380 and assigns the data groups to the transmission antennas. The Node B 10 receives feedback information indicating the transmission statuses of the transmission antennas 374, 376, 378, and 380 from the UEs 20 to 24. The feedback information is fed to a channel estimator & transmission antenna assigner 368. A feedback information receiver 370 extracts the feedback information using the channel information and input signals received from the channel estimator & transmission antenna assigner 368. A controller 366 controls the channel estimator & transmission antenna assigner 368 based on the feedback information to assign the data groups to the transmission antennas 374, 376, 378, and 380. A transmission status information transmitter 372 transmits to the UEs 20 to 24 the control information used for the assignment of the data groups.

Figure 16:
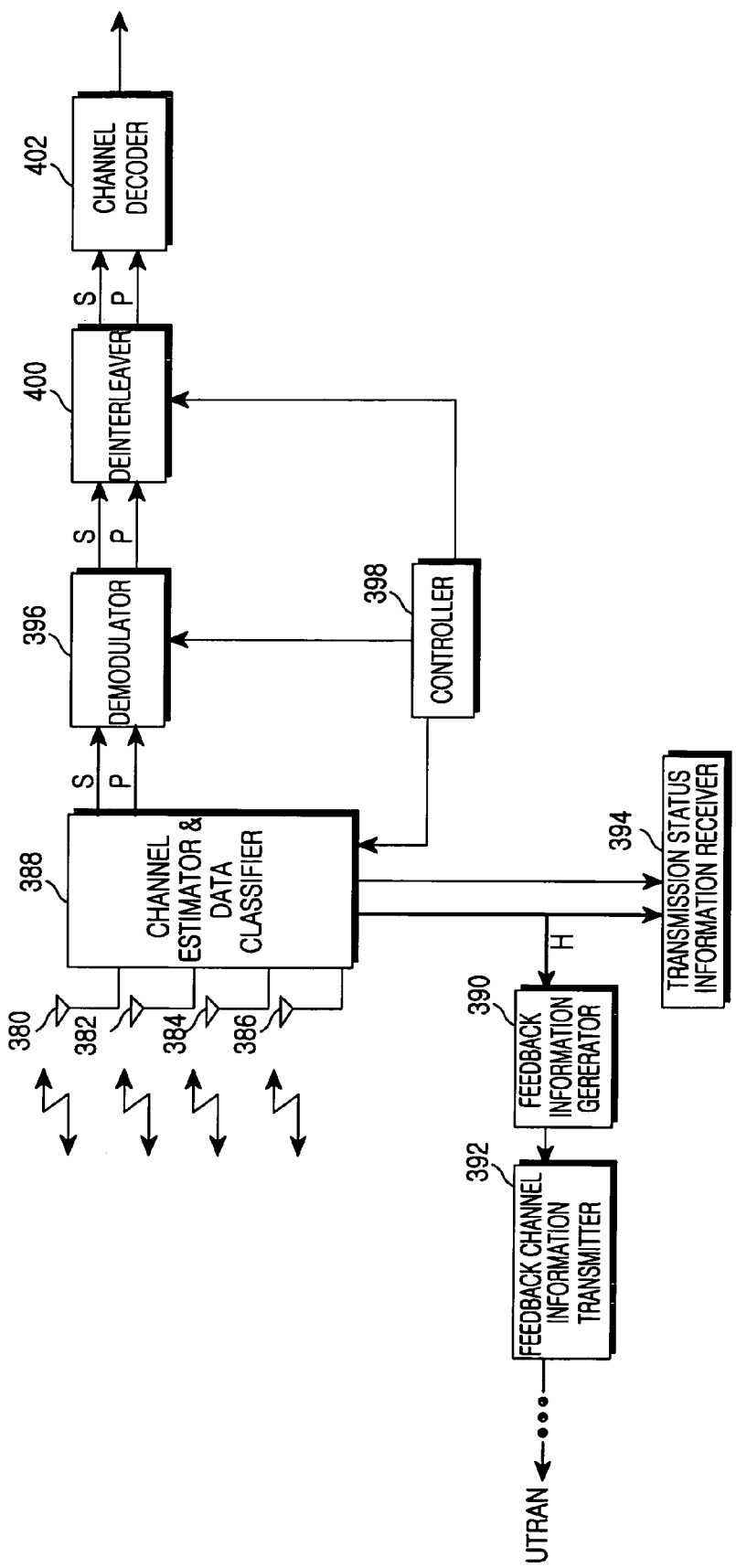
FIG. 16 is a block diagram of a receiver corresponding to the transmitter illustrated in FIG. 15.

FIG. 16 is a block diagram of a receiver corresponding to the transmitter illustrated in FIG. 15. As illustrated in FIG. 16, the receiver includes a transmission status information receiver 394 as in the second embodiment and a feedback information generator 390 and a feedback channel information transmitter 392 as in the third embodiment. Therefore, the receiver can receive/transmit transmission status information from/to the Node B.

Referring to FIG. 16, a UE 20, 22, . . . , or 24 receives signals through reception antennas 380, 382, 384, and 386 in a reception antenna array. A channel estimator & data classifier 388 estimates channel statuses determined by the Node B 10. The feedback information generator 390 generates feedback information indicating the transmission status of each transmission antenna using the channel estimation information received from the channel estimator & data classifier 388 in the same manner as in the third embodiment. The feedback channel information transmitter 392 transmits the feedback information in a predetermined format to the Node B 10.

The transmission status information receiver 394 extracts control information used to determine the transmission status of each transmission antenna in the Node B after the previous feedback, from the input signal and channel information received from the channel estimator & data classifier 388. A controller 398 classifies data according to the transmission antennas by comparing the control information with the previous feedback information. The channel estimator & data classifier 388 multiplexes received data in an input format for a demodulator 306 under the control of the controller 398.

Referring to FIGS. 15 and 16, in operation, the UE measures the transmission statuses of channels established with the Node B 10 at the channel estimator & data classifier 388. Meanwhile, the UE generates control information from the transmission status measurements at the feedback information generator 390. The control information is fed back to the Node B through the feedback channel information transmitter 392.

The Node B 10 extracts the feedback information at the feedback information receiver 370. The controller 366 determines the order of the transmission statuses of the transmission antennas according to the feedback information. The order of the transmission statuses is used to assign data groups to the transmission antennas 374, 376, 378, and 380. The Node B 10 transmits control information used to assign transmission data to the transmission antennas 374, 376, 378, and 380 to the UEs 20 to 24 through the transmission status information transmitter 372. The UEs 20 to 24 use the control information received from the Node B 10 to classify received data into the data groups mapped to the transmission antennas 374, 376, 378, and 380.

In accordance with the present invention, high-priority data is assigned to a transmission antenna at a good transmission status in a mobile communication system including an antenna array. Therefore, transmission efficiency is increased in the fields of error control coding, modulation/demodulation, and data transmission. Thus BER (Bit Error Rate) is decreased and system performance is improved across a system. The present invention is applicable to all transmitters and receiver irrespective of wires/wired communications and particularly, its application to the third generation mobile communication (IMT-2000) will increase overall system performance.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of receiving at a receiver including a plurality of second antennas from a transmitter including a plurality of first antennas on a plurality of radio channels in a mobile communication system, comprising the steps of:
   determining statuses of the radio channels; and
   classifying high-priority data and low-priority data received through the second antennas according to the channel statuses and demodulating the high-priority data and the low-priority data,
   wherein the high-priority data is systematic coded bits and the low-priority data is parity coded bits.

2. The method of claim 1, wherein the radio channels are downlink channels.

3. The method of claim 1, wherein the transmitter determines the statuses of the radio channels and transmits information about the channel statuses to the receiver.

4. The method of claim 1, wherein the receiver determines the statuses of the radio channels and feeds back information about the channel statuses to the transmitter.

5. An apparatus for receiving data at a receiver including a plurality of second antennas from a transmitter including a plurality of first antennas on a plurality of radio channels in a mobile communication system, comprising:

a channel estimator for determining statuses of the radio channels;
a data classifier for classifying high-priority data and low-priority data received through the second antennas according to the channel statuses; and
a demodulator for demodulating the high-priority data and the low-priority data separately,
wherein the high-priority data is systematic coded bits and the low-priority data is parity coded bits.

6. The apparatus of claim 5, wherein the radio channels are downlink channels.

7. The apparatus of claim 5, further comprising a feedback information generator for generating feedback information indicating the channel statuses in a predetermined format; and
a feedback channel information transmitter for transmitting the feedback information to the transmitter.

8. The apparatus of claim 5, further comprising a transmission status information receiver for receiving information about the channel statuses from the transmitter.

9. The apparatus of claim 5, further comprising a deinterleaver for separately deinterleaving the high-priority data and the low-priority data.

10. The apparatus of claim 5, wherein the demodulator demodulates the high-priority data and the low-priority data in different demodulation schemes.

11. A method of transmitting data in a mobile communication system using multiple transmission antennas, comprising the steps of:
   estimating transmission status for each transmission antenna;
   classifying transmission data groups as a different data group according to priority of data to be transmitted; and
   assigning the transmission data groups to each transmission antenna according to the transmission status of the transmission antennas and the priority of the transmission data groups, wherein information bits output by encoding the data to be transmitted are classified into the high-priority data groups and parity bits output by encoding the data to be transmitted are classified into the low-priority data groups.

12. The method of claim 11, wherein the transmission statuses for each transmission antenna are estimated by the transmission statuses of downlink channels.

13. The method of claim 11, wherein the transmission statuses for each transmission antenna are estimated by feedback information received from a UE.

14. The method of claim 11, wherein the high-priority data groups among the data groups are assigned to transmission antennas having good channel statuses.

15. The method of claim 11, wherein the low-priority data groups among the data groups are assigned to transmission antennas having poor channel statuses.

16. An apparatus for transmitting data in a mobile communication system using multiple transmission antennas, comprising:
   a controller for controlling transmission antennas assignment according to transmission status for each transmission antenna;
   a channel estimator for estimating transmission status for each transmission, and reporting the transmission status to the controller; and
   a data classifier for classifying transmission data groups as a different data group according to priority of data to be transmitted, and assigning the data groups having different priority to each transmission antenna by the controller, wherein the data classifier classifies information bits output by encoding the data to be transmitted into the high-priority data groups, and the data classifier classifies parity bits output by encoding the data to be transmitted into the low-priority data groups.

17. The apparatus of claim 16, wherein the channel estimator estimates the transmission statues for each transmission antenna by the transmission status of downlink channels.

18. The apparatus of claim 16, wherein the channel estimator estimates the transmission statues for each transmission antenna by feedback information received from a UE.

19. The apparatus of claim 16, wherein the controller controls that the high-priority data groups among the data groups are assigned to transmission antennas having good channel statuses.

20. The apparatus of claim 16, wherein the controller controls that the low-priority data groups among the data groups are assigned to transmission antennas having poor channel statuses.

21. A method of receiving data in a mobile communication system using multiple reception antennas, comprising the steps of:

estimating transmission status for each reception antenna;

classifying signals received through the reception antennas according to the estimated transmission status, into high-priority data groups and low-priority data groups;

multiplexing modulation symbols of the high-priority data groups;

multiplexing modulation symbols of the relatively low-priority data groups; and demodulating the multiplexed modulation symbols, wherein the modulation symbols of the high-priority data groups are information modulation symbols, and the modulation symbols of the low-priority data groups are parity modulation symbols.

22. The method of claim 21, wherein the high-priority data groups are received through the reception antennas having good channel statuses.

23. The method of claim 21, wherein the low-priority data groups are received through the reception antennas having relatively poor channel statuses.

24. An apparatus for receiving data in a mobile communication system using multiple reception antennas, comprising:

a controller for controlling classification of data groups according to transmission status for each reception antenna;

a channel estimator for estimating transmission status for each reception antenna, and reporting the transmission status to the controller;

a data classifier for classifying signals received through the reception antennas by the controller, and multiplexing modulation symbols of the high-priority data groups and modulation symbols of the low-priority data groups; and a demodulator for demodulating the multiplexed modulation symbols, wherein the modulation symbols of the high-priority data groups are information modulation symbols, and the modulation symbols of the low-priority data groups are parity modulation symbols.

25. The apparatus of claim 24, wherein the high-priority data groups are received through the reception antennas having good channel statuses.

26. The apparatus of claim 24, wherein the low-priority data groups are received through the reception antennas having relatively poor channel statuses.

* * * * *